US010244368B2

(12) United States Patent
Martin et al.

(10) Patent No.: US 10,244,368 B2
(45) Date of Patent: *Mar. 26, 2019

(54) METHOD AND APPARATUS FOR AUTOMATICALLY IDENTIFYING AND ANNOTATING AUDITORY SIGNALS FROM ONE OR MORE PARTIES

(71) Applicant: Eolas Technologies Inc., Tyler, TX (US)

(72) Inventors: David C. Martin, San Jose, CA (US); Michael D. Doyle, Glen Ellyn, IL (US)

(73) Assignee: Eolas Technologies Inc., Tyler, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/927,198

(22) Filed: Mar. 21, 2018

(65) Prior Publication Data
US 2018/0213373 A1  Jul. 26, 2018

Related U.S. Application Data

(63) Continuation of application No. 14/208,278, filed on Mar. 13, 2014, now Pat. No. 10,070,283.

(60) Provisional application No. 61/789,945, filed on Mar. 15, 2013.

(51) Int. Cl.
*H04W 4/18* (2009.01)
*H04M 3/56* (2006.01)

(52) U.S. Cl.
CPC .......... *H04W 4/18* (2013.01); *H04M 2250/68* (2013.01)

(58) Field of Classification Search
CPC ..... H04M 3/53366; H04M 2203/4563; H04M 2203/552; H04M 11/00; H04M 3/56
USPC ................... 704/251; 455/413, 412.1, 412.2
See application file for complete search history.

(56) References Cited

U.S. PATENT DOCUMENTS

| | | |
|---|---|---|
| 8,223,932 B2 | 7/2012 | Forbes et al. |
| 8,498,625 B2 | 7/2013 | Trivi |
| 8,537,980 B2 | 9/2013 | Frazier et al. |
| 8,606,576 B1 | 12/2013 | Barr et al. |
| 8,615,660 B1 | 12/2013 | Selman et al. |
| 8,751,240 B2 | 6/2014 | Lewis et al. |
| 8,972,506 B2 | 3/2015 | Frazier et al. |
| 2006/0293888 A1 | 12/2006 | Jindal |
| 2008/0275701 A1* | 11/2008 | Wu ................... G06F 17/30017 704/235 |
| 2011/0033036 A1 | 2/2011 | Edwards et al. |
| 2013/0070093 A1 | 3/2013 | Rivera et al. |
| 2014/0081989 A1 | 3/2014 | Chang et al. |
| 2014/0096667 A1 | 4/2014 | Chapman et al. |

* cited by examiner

*Primary Examiner* — Julio R Perez
(74) *Attorney, Agent, or Firm* — Neal, Gerber, & Eisenberg LLP

(57) ABSTRACT

In one embodiment, a mobile device application automatically identifies and annotates auditory signals from one or more parties.

14 Claims, 2 Drawing Sheets

METHOD AND APPARATUS FOR AUTOMATICALLY IDENTIFYING AND ANNOTATING AUDITORY SIGNALS FROM ONE OR MORE PARTIES

PRIORITY CLAIM

This application claims priority to and the benefit of U.S. Non-Provisional patent application Ser. No. 14/208,278, filed Mar. 13, 2014, and U.S. Provisional Patent Application No. 61/789,945, filed Mar. 15, 2013, the entire contents of each of which are incorporated herein by reference.

TECHNICAL FIELD

The present disclosure relates generally to telecommunications over wireless networks.

BACKGROUND

Users of smart phones and other mobile devices are often given important information during a conversation. Circumstances often make taking notes difficult and the user is will lose the information unless it can be remembered

DETAILED DESCRIPTION OF EXEMPLARY EMBODIMENTS

Overview

Figure 1:
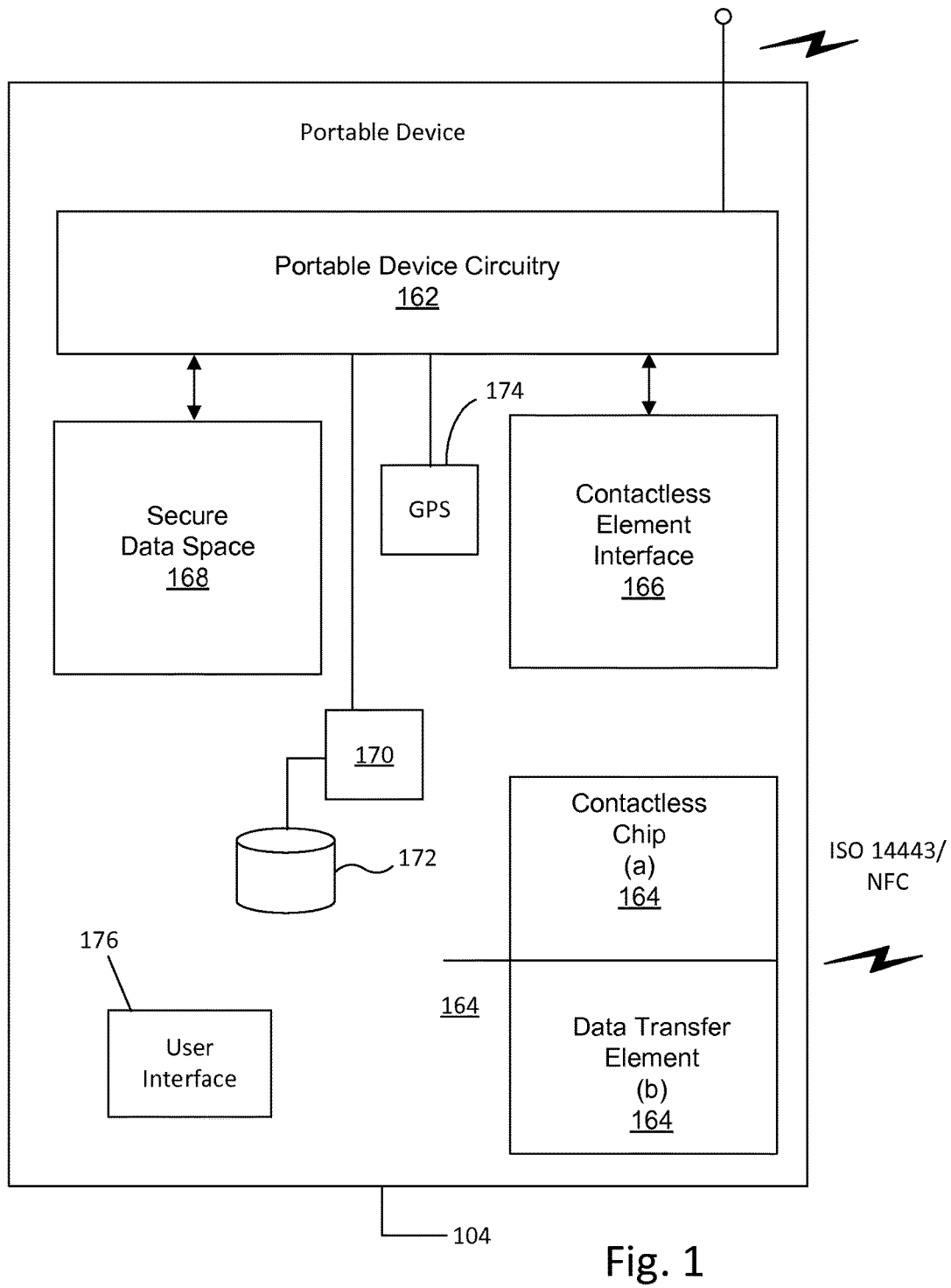
FIG. 1 is a block diagram of an example portable multi-functional device.

Embodiments of the invention address the need to identify and annotate auditory data streams with structural information. For example, in a telephone conversation between two parties using cellular smart phones, the phone application would process, either locally or remotely or any combination, the auditory data stream to identify the mention of specific entities, e.g. telephone numbers, email addresses, dates and times, locations, etc. These identified entities are displayed to the parties who may indicate actions to perform with or on that entity, including disregarding due to non-relevance, inaccuracy, imprecision, or other attribute that may be used to train the underlying system on contexts in which those entities are relevant and what additional action, e.g. adding to contacts, calendar, or other applications on the mobile device.

Description

Reference will now be made in detail to various embodiments of the invention. Examples of these embodiments are illustrated in the accompanying drawings. While the invention will be described in conjunction with these embodiments, it will be understood that it is not intended to limit the invention to any embodiment. On the contrary, it is intended to cover alternatives, modifications, and equivalents as may be included within the spirit and scope of the invention as defined by the appended claims. In the following description, numerous specific details are set forth in order to provide a thorough understanding of the various embodiments. However, various embodiments may be practiced without some or all of these specific details. In other instances, well known process operations have not been described in detail in order not to unnecessarily obscure the present invention. Further, each appearance of the phrase an "example embodiment" at various places in the specification does not necessarily refer to the same example embodiment.

In an example embodiment the cellular phone application (CPA) utilizes the intervening telecommunications infrastructure to route digital auditory data in real-time to a cloud-based phone recognition and entity identification, annotation and relevance processing system, which in turn sends selected relevant annotated entities to said CPA for use in interacting with user. In this example embodiment the CPA displays such annotated entities as they are received, which may or may not synchronize in real-time with said auditory stream, either as a result from automated processing (e.g. "A new calendar entry has been created for XX on YY at ZZ") or for subsequent user interaction prior to additional processing, e.g. in a conversation between two users, Bob and Paul, the CPA makes use of Bob's local address book to know the name of the other party, Paul. For example, a possible conversation, and the corresponding CPA response would be:

Bob: What number should I call?
Paul: I would call 800-555-1212 and then enter conference code 12345 followed by the hash sign.
Bob: Thanks let me find a pen.
CPA: "Paul mentioned a phone number (800-555-1212); would you like me to record that number?"
1. Ignore, not relevant.
2. No, thank you.
3. Yes, as a new number for Paul.
4. Yes, as number to call.
Bob: <indication of option 4>
Bob: Paul, don't worry, I got it.
CPA: "Paul mentioned what sounded like a meeting code after the telephone number you asked to call, 12345#, would you like me to add that to the telephone number?"
1. Ignore, not relevant
2. No, thank you.
3. Yes, as a meeting code.
4. Yes, as another number.
Bob: <indication of option 3>
Bob: Paul, thanks; I got it. I will talk to you in a couple minutes.
Paul: Bob, talk to you soon.
CPA: Would you like to call telephone number 800-555-1212 meeting code 12345# now or later?
1. Ignore, not relevant
2. No, please remind me later.
3. Yes, please call now.
4. Yes, let's schedule it.
Bob: <indication of option 3>

In an alternative embodiment (AE), the CPA audio stream is monitored by a text-to-speech application, running in the background on the user's handset, that converts the audio signal to text, to create a real-time textual transcript of the conversation upon the AE can act to perform knowledge management functions. This transcript is presented to the user in a visual display similar in layout to a txt chat application such as iMessage, wherein each interchange of the conversation is presented to the viewer in a shaded message 'bubble' with the user's communications aligned along the right edge of the application window, and the remote participant's communications aligned along the left.

Pauses longer than an adjustable time threshold cause new message bubbles to be created. As the conversation proceeds, the message bubble window continuously scrolls the conversation transcript upwards.

If the user sees a information within a message bubble that the user is desirous to have knowledge management functions performed upon, the user can tap on that message bubble to cause a option-selection dialog to be presented whereby the user can choose the desired function to be performed.

The choices presented are dependent upon the content and the context of the text within the selected message bubble. Some choices may be, for example, to have the AE create a new appointment in the user's calendar app based upon the subject, date and time mentioned in the message bubble, or to check reservation availability at a restaurant based upon the mention of the restaurant's name and a date and time in the message bubble.

In another alternative embodiment (AE2), the system can be used to build and complete an information model via annotated audio stream processing. Using a speech-to-text converter in conjunction with an entity extraction and identification text processing system, a stream of words with associated annotated objects entities is emitted by capturing the speech of parties engaged in knowledge engineering an information model or completing an instance of that model.

In both instances, either a meta-information model or a specific information model, the speech-to-text-to-entities process yields objects that are defined in the model. For example, an interviewer (A) and interviewee (B) engaged in completing a information model corresponding to a police report. In this example, the interviewer (A) would be prompted with lines of inquiry about high priority entities and relationships in the model, e.g. victim, alleged perpetrator, arresting officer, et. al. as well as the relationships amongst those entities (e.g. <arresting officer> may be different from <first officer on scene>). Additionally, as entities are spoken and identified, including pronouns and other alternative indicators of said entities, the identification as well as the disambiguation of entities ("the officer" refers to which previously mentioned <officer> or spoken "he" may refer to victim, perpetrator, officer, et. al.

The information model guides the interview process to continually identify high priority lines of inquiry, disambiguation of entities, relationships, attributes and values, etc. as the interview proceeds; even with relatively long delays in processing the speech to relevant and priorities entities (e.g. several minutes), the dynamic nature of the process allows for prior subjects to be revisited when necessary.

Yet another embodiment involves the incorporation into the system of the AE a fact-checking module. The fact-checking module is a system component that, provides for an additional message-bubble-selection choice: an option to have the system automatically parse and analyze the content of the message bubble so that the system can discern distinguishable facts from the message content, and proceed to automatically search online reference materials for relevant information, and to present that information to the user. This will be particularly useful, for example, to a newspaper reporter doing a phone interview, so that the reporter can check on the factual basis of assertions being made by the interviewee, even while the interview is underway.

FIG. 1 shows an enlarged view of the portable (mobile) multifunctional device 104. For example, if the portable multifunctional device 104 is a cellular telephone, then the portable device circuitry includes a communication link that may support protocols such as Global System for Mobile communication (GSM), General Packet Radio Service (GPRS), Enhanced Data Rates for Global Evolution (EDGE), Universal Mobile Telecommunications Service (UMTS), etc. The communication interface of the device 104 may also/alternately support Wireless Wide Area Network (WWAN), Wireless Local Area Network (WLAN), and/or Wireless Personal Area Network (WPAN), etc.

Device 104 may further include a contactless element 164, typically implemented in the form of a semiconductor chip 164(a) with an associated wireless data transfer (e.g., data transmission) element 164(b), such as an antenna. Contactless element 164 is associated with (e.g., embedded within) portable device 104 and data such as a coupon or control instructions transmitted via cellular network may be applied to contactless element 164 by means of contactless element interface 166. Contactless element interface 166 functions to permit the exchange of data and/or control instructions between the portable device circuitry 162 (and hence the cellular network) and contactless element 164.

The contactless element may also include a Near Field Communication (NFC) module or other near field wireless reader module that allows the portable multifunctional device to communicate with a point of sale terminal (POS) at a merchant location by tapping the portable multifunctional device to a reader.

Contactless element 164 is capable of transferring and receiving data using a near field communications capability (or near field communications medium) typically in accordance with a standardized protocol or data transfer mechanism (identified as ISO 14443/NFC in the figure). Near field communications capability is a short-range communications capability, such as RFID, infra-red, or other data transfer capability that can be used to exchange data between the portable device 104 and a local apparatus by tapping the portable device to the local apparatus, for example located at point-of-sale of a merchant or another location at which coupons are expected to be redeemed. Thus, portable device 104 is capable of communicating and transferring data and/or control instructions via both cellular network and near field communications capability.

Portable device 104 may also include a secure data space 168, which may be used by the device to store operating parameters and/or other data utilized in operation of the device. The secure data space 168 may be in the form of a chip that is separate and apart from the chip in the contactless element 164, or alternatively, could be a section of memory in the chip that forms part of the contactless element 164. Note that the chip in the contactless element 164 may include data storage capability in the form of a memory that may be accessed via interface 166 to permit the implementation of read, write, and erase functions, for example.

In accordance with still other embodiments, the portable device may further include a processor 170 and computer readable storage medium 172 for storing code and configured to direct the processor to perform various tasks. For example, the computer readable storage medium may comprise a magnetic disk drive or a flash memory chip. A smart phone includes an operating system such as Google Android or Apple iOS operating system.

The computer readable storage medium may contain code that is configured to cause a processor of the portable consumer device to receive and recognize a message including a coupon and code that is delivered to the portable device. The computer readable storage medium may also include code that is configured to decrypt an encrypted message including the code that is received by the portable device.

In accordance with certain embodiments, the portable device 104 further includes a Global Positioning System (GPS) element 174. GPS element 174 is configured to allow determination of the location of the user at any time. In particular, GPS element 174 relies upon signals from a plurality of orbiting satellites in order to allow the user's location to be determined. Location information obtained from the GPS element 174 may in turn be communicated through the antenna to allow monitoring of the user's position.

The GPS receiver determines a geographic location for the device by calculating a distance between the device and at least three satellites using low-power radio signals received from the satellites using a technique known as Trilateration, which is known in the art.

The portable multifunctional device includes an input interface 176 such as, for example, a touch screen, keypad (which for present purposes will be understood to include the other buttons, switches and keys referred to or may be implemented as soft keys on the display) for receiving user input, a display component for displaying output information to the user and conventional receive/transmit circuitry. Other suitable input interfaces include a light pen, track ball, data glove, microphone, etc. The portable multifunctional device also includes an input/output interface that may include a keypad, a mouse, a screen, a touch screen, and/or any other type of interface that allows a user of the device to interact with the device.

Figure 2:
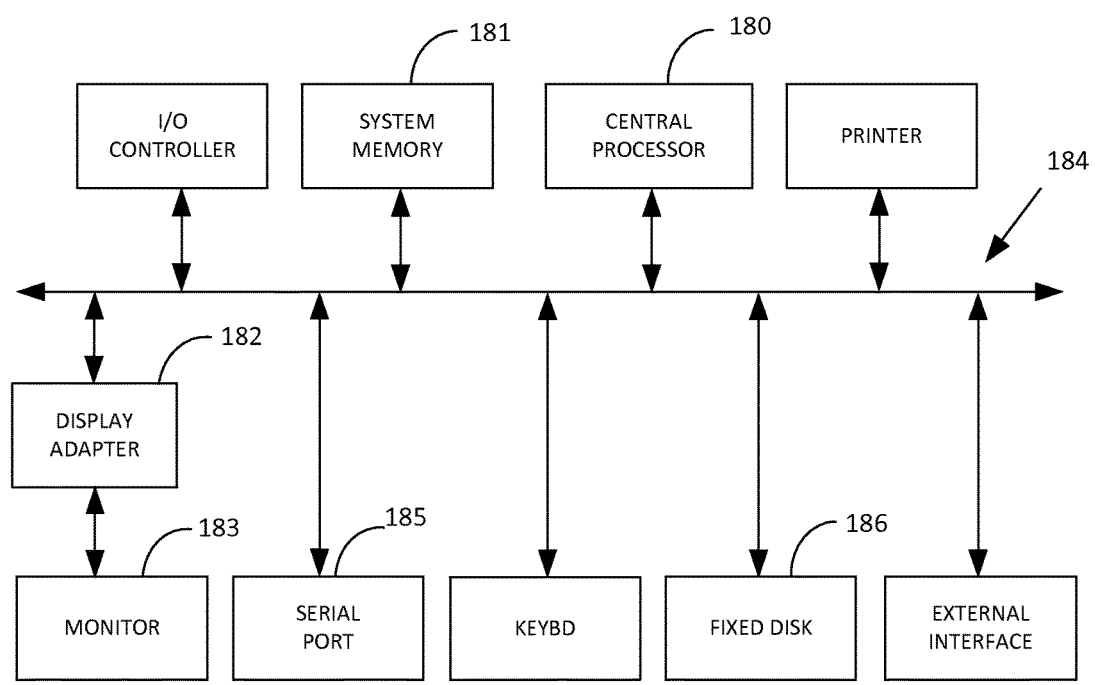
FIG. 2 is a block diagram illustrating and example server or client computer workstation.

FIG. 2 is an illustration of basic subsystems in a client or server computer system workstation usable to implement cloud based computing. In FIG. 2, subsystems are represented by blocks such as central processor 180, non-transitory system memory 181 consisting of random access memory (RAM) and/or read-only memory (ROM), display adapter 182, monitor 183, etc. The subsystems are interconnected via a system bus 184. Additional subsystems such as a printer, keyboard, fixed disk and others are shown. Peripherals and input/output (I/O) devices can be connected to the computer system by, for example serial port 185. For example, serial port 185 can be used to connect the computer system to a modem for connection to a network or serial port 185 can be used to interface with a mouse input device. The interconnection via system bus 184 allows central processor 180 to communicate with each subsystem and to control the execution of instructions from system memory 181 or fixed disk 186, and the exchange of information between subsystems.

Other arrangements of subsystems and interconnections are possible.

Some example embodiments are implemented as program code embodied in a non-transitory computer readable storage medium. The program code is executed by one or more processors to perform the steps described above.

Various example embodiments have been described above. Alternatives and substitutions will now be apparent to persons of skill in the art. For example, embodiments using cellular phone applications are described, however, the principles described herein can be applied to other types of application being executed on mobile devices. Accordingly, it is not intended to limit the invention except as provided by the appended claims.

The invention is claimed as follows:

1. A telecommunication system comprising:
one or more processors; and a computer readable memory storing program code which, when executed by the one or more processors, causes the one or more processors to at least:

after a communication is established by a first electronic communication device and a second electronic communication device, receive, at the telecommunication system, from the first electronic communication device, digital auditory data corresponding to an ongoing conversation between a first person using the first electronic communication device and a second person using the second electronic communication device, the conversation including a plurality of words spoken by the first person and the second person during the ongoing conversation;

while the conversation is ongoing between the first person using the first electronic communication device and the second person using the second electronic communication device, responsive to one or more user requests associated with a displayed message bubble of converted text based on the digital auditory data, process the converted text of the displayed message bubble to identify a fact included in the converted text, wherein the displayed message bubble of converted text is displayed by the first electronic communication device, wherein the one or more user requests are received via the first electronic communication device, and wherein the first electronic communication device is configured to display the displayed message bubble of converted text after a pause duration satisfies a time threshold, the pause duration configured to be detected while the conversation is ongoing between the first person using the first electronic communication device and the second person using the second electronic communication device;

facilitate searching online reference material for information related to the identified fact;

and facilitate displaying of the information related to the identified fact by at least one of the first electronic communication device and the second electronic communication device.

2. The telecommunication system of claim 1, wherein the searching is to check accuracy of the identified fact.

3. The telecommunication system of claim 1, wherein the time threshold is an adjustable amount.

4. The telecommunication system of claim 1, wherein the displayed message bubble of converted text is one of a plurality of displayed message bubbles of converted text based on the digital auditory data, and wherein each one of the plurality of displayed message bubbles is a user-selectable message bubble displayed by the first electronic communication device.

5. The telecommunication system of claim 4, wherein the first electronic device is configured to display a user-selectable option menu based on a user-selection of the displayed message bubble of converted text.

6. The telecommunication system of claim 5, wherein the program code, when executed, causes the one or more processors to process the converted text of the displayed message bubble to identify the fact included in the converted text in response to a user selection of a fact-checking option included in the user-selected option menu.

7. The telecommunication system of claim 1, wherein the program code, when executed, causes the one or more processors to facilitate the displaying of the information related to the identified fact while the conversation is ongoing between the first person using the first electronic communication device and the second person using the second electronic communication device.

8. A telecommunication system comprising:

one or more processors; and a computer readable memory storing program code which, when executed by the one or more processors, causes the one or more processors to at least:

after a communication is established by a first electronic communication device and a second electronic communication device, receive, at the telecommunication system, from the second electronic communication device, digital auditory data corresponding to an ongoing conversation between a first person using the first electronic communication device and a second person using the second electronic communication device, the conversation including a plurality of words spoken by the first person and the second person during the ongoing conversation;

while the conversation is ongoing between the first person using the first electronic communication device and the second person using the second electronic communication device, responsive to one or more user requests associated with a displayed message bubble of converted text based on the digital auditory data, process the converted text of the displayed message bubble to identify a fact included in the converted text, wherein the displayed message bubble of converted text is displayed by the first electronic communication device, wherein the one or more user requests are received via the first electronic communication device, and wherein the first electronic communication device is configured to display the displayed message bubble of converted text after a pause duration satisfies a time threshold, the pause duration configured to be detected while the conversation is ongoing between the first person using the first electronic communication device and the second person using the second electronic communication device;

facilitate searching online reference material for information related to the identified fact;

and facilitate displaying of the information related to the identified fact by at least one of the first electronic communication device and the second electronic communication device.

9. The telecommunication system of claim 8, wherein the searching is to check accuracy of the identified fact.

10. The telecommunication system of claim 8, wherein the time threshold is an adjustable amount.

11. The telecommunication system of claim 8, wherein the displayed message bubble of converted text is one of a plurality of displayed message bubbles of converted text based on the digital auditory data, and wherein each one of the plurality of displayed message bubbles is a user-selectable message bubble displayed by the first electronic communication device.

12. The telecommunication system of claim 11, wherein the first electronic device is configured to display a user-selectable option menu based on a user-selection of the displayed message bubble of converted text.

13. The telecommunication system of claim 12, wherein the program code, when executed, causes the one or more processors to process the converted text of the displayed message bubble to identify the fact included in the converted text in response to a user selection of a fact-checking option included in the user-selected option menu.

14. The telecommunication system of claim 8, wherein the program code, when executed, causes the one or more processors to facilitate the displaying of the information related to the identified fact while the conversation is ongoing between the first person using the first electronic communication device and the second person using the second electronic communication device.

* * * * *